M. W. LINK.
AUTOMOBILE AXLE GAGE.
APPLICATION FILED JULY 2, 1913.
1,114,374.
Patented Oct. 20, 1914.
Fig. 1.
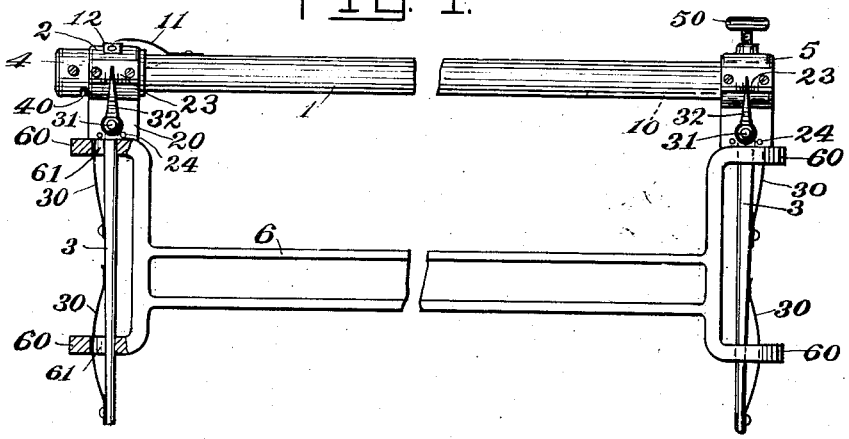
Fig. 2. Fig. 3. Fig. 5. Fig. 6.
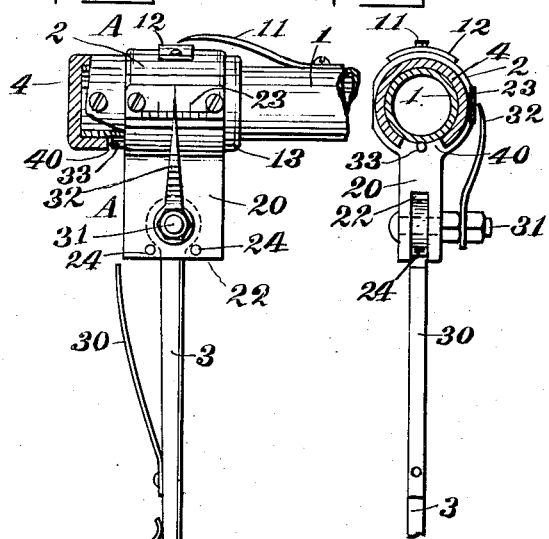 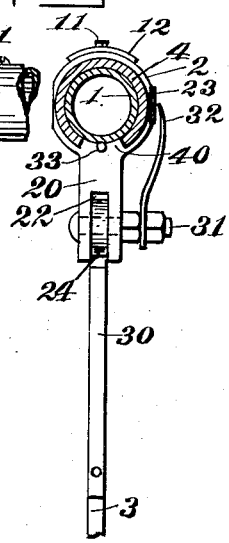 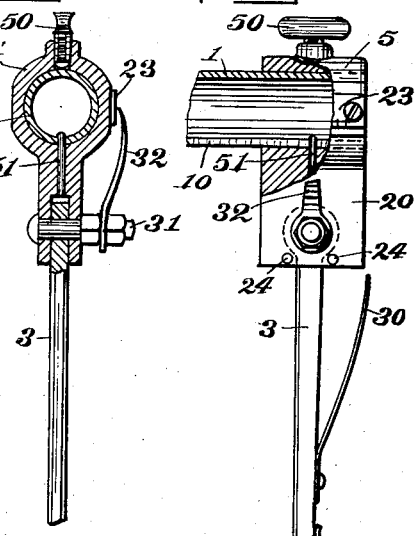 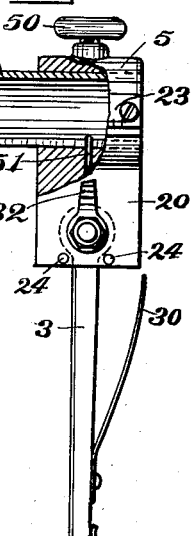
Fig. 4.
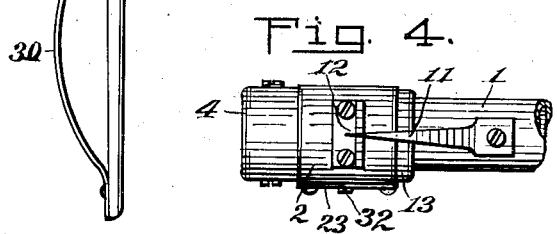
Witnesses
George H. Morse.
Charles Reynolds.
Inventor:
Manfred W. Link.
By Henry L. Reynolds.
Attorney.

UNITED STATES PATENT OFFICE.

MANFRED W. LINK, OF SEATTLE, WASHINGTON.

AUTOMOBILE AXLE-GAGE.

1,114,374.   Specification of Letters Patent.   Patented Oct. 20, 1914.

Application filed July 2, 1913. Serial No. 777,126.

*To all whom it may concern:*

Be it known that I, MANFRED W. LINK, a citizen of the United States, and resident of Seattle, King county, State of Washington, have invented certain new and useful Improvements in Automobile Axle-Gages, of which the following is a specification.

My invention relates to an improvement in axle setting gages and is particularly designed for use upon the steering axles of automobiles. It may therefore be called an automobile axle setting gage.

The object of my invention is to provide a device which may be used to facilitate the accurate setting of the steering axle of automobiles, that is, the positioning of the journals upon which the steering wheels swing in steering.

My invention comprises the novel constructions and parts and the combinations thereof, which will be hereinafter described and particularly pointed out in the claims.

In the accompanying drawings I have shown my invention in the form which is now preferred by me.

Figure 1 shows an automobile steering axle with my gage applied thereto to set its wheel-carrying journals. Fig. 2 is a side elevation of one end of the gage, a small portion of the pipe-closing cap being shown in section. Fig. 3 is a section taken on the line A, A, of Fig. 2. Fig. 4 is a top plan view of the same end of the gage. Fig. 5 is a transverse section through the finger-carrying slide at the opposite end of the gage. Fig. 6 is a side elevation and partial section of the same end of the gage.

The frame upon which I have mounted my gage consists, as herein shown, of a pipe 1, of sufficient length to extend between the wheel pivots of the largest sized axle for which the gage is expected to be used. Upon one end of the pipe 1 is secured a short sleeve 2, so that it may turn about the pipe, but is held against sliding lengthwise upon the pipe. To secure this result I have shown a cap 4 as secured to the end of the pipe and forming an abutment for the engagement of the outer end surface of the sleeve 2. A ring 13 at the inner margin of the sleeve 2 prevents its movement farther on the pipe 1. To permit only a limited rocking movement of this sleeve upon the pipe, I have given the inner edge of the cap 4, a notch or recess 40, within which lies a pin 33 carried by the sleeve 2. This is clearly shown in Fig. 3. This permits the sleeve and the gage arm or finger 3, to swing about the pipe as an axis, within a limited arc. To have a means of judging the relative central position of the gage finger, I have provided a scale 12 carried by the outer surface of the sleeve, and a finger or index pointer 11 secured to the pipe and having its end adjacent said scale 12. This pointer and scale will show in which direction the axle pivots are bent and give some indication as to how much they will have to be bent to bring them back into alinement with the opposite pair of pivots.

The sleeve 2 has an arm 20 projecting at one side. to which is pivoted the gage finger 3. This is preferably done by slotting the arm 20 and pivoting the end of the finger 3 within the slot 22. I also prefer to limit the arc of swing of this gage finger within a small range. I have shown this as being secured by two pins 24 which engage the sides of the finger upon a slight swing either side of the center. Upon the pivot pin 31, I also secure an index finger 32, which extends over the side surface of the sleeve 2, where is secured a scale 23, the zero indication of this being so placed that the index finger will register therewith when the gage finger is at right angles with the plane of the contacting surfaces between the arm 20 and the yokes which contain the bearings for the wheel pivots.

At the other end of the pipe 1 is a sleeve 5, and an attached gage finger 3, which is, in the main, of like construction. This sleeve 5 is, however, adjustable along the length of the pipe and is not permitted to rock upon the pipe. It is provided with a pin 51, which enters a slot 10, which extends a sufficient distance inward from the end of the pipe to permit the maximum adjustment desired. This slot in the pipe will vary in length with the variation in distance between the longest and shortest distance between the wheel pivots of different machines with which it is intended for use. This distance would approximate from 16 to 20 inches. It may be made anything desired, and if the gage is intended for use with axles in which this distance would be the same for all, the adjustment lengthwise the pipe might be dispensed with. The pivoting of the gage fingers 3, may be alike at each end, as also the index finger 30 and the scale 23. I provide the gage fingers 3 with springs 30, which engage the outer walls of the pivot journals, so as to hold the fingers in close contact with the inner walls of said journals.

In using this gage, the fingers 3 are inserted within the journals which receive the pivot bearings of the wheels. The indications of the pointers 32, show in what direction it may be necessary to bend the axle to bring the journals into proper position in their common plane. The indication of the index finger 11, will show in which direction and approximately what amount the axle will need to be twisted to bring both journals into a common plane. This twisting and bending may be done while the gage is in place, the index pointers showing when this has been carried far enough.

What I claim as my invention and desire to patent is:

1. An automobile axle gage comprising a frame bar extending from one wheel pivot to the other, gage fingers pivoted, one at each end, to swing in the plane of said frame bar and adapted to enter the wheel-pivot journals, one of said gage fingers having a limited swinging movement about the axis of said frame bar, and means for indicating the position of said fingers with relation to the correct position of the wheel pivots.

2. An automobile axle gage comprising a frame bar extending from one wheel pivot to the other, a gage finger mounted upon each end of said frame bar and adapted, each to enter its respective wheel-pivot journal, springs carried by said fingers and adapted to hold the fingers in contact with one side of said wheel-pivot journals, and means indicating the position of said fingers with relation to their correct position.

3. An automobile axle gage comprising a frame bar adapted to extend from one wheel pivot to the other, a finger mounted upon each end of said frame bar and adapted to enter the wheel pivot journals, one of said gage fingers being adjustable lengthwise the frame bar and the other to rock about the axis of the frame bar, both fingers being pivoted to swing in the plane of said frame bar, and index fingers associated with each of said swinging movements.

4. An automobile axle gage comprising a frame bar of a length to extend from one wheel-pivot journal to the other, a sleeve carried by each end of said frame bar, one of said sleeves being held against movement lengthwise the frame bar but capable of limited rocking movement about the axis of said frame bar, the other sleeve being movable lengthwise the frame bar but held against rocking movement about its axis, gage fingers pivoted, one upon each of said sleeves to swing in the plane of said frame bar, and an indicating device associated with each of the swinging movements of said gage fingers.

5. An automobile axle gage comprising a frame consisting of a pipe of a length to extend from one wheel-pivot journal to the other, a sleeve mounted to rock upon said pipe at one end, pivot jaws extending from said sleeve, a gage finger pivoted between said jaws to swing in the plane of the pipe, an index finger carried by the pivot of said gage finger and extending over one side of the sleeve, a scale secured to the side of said sleeve and coöperating with said index finger, an index finger secured to the pipe and extending over the side of said sleeve, a scale carried by said sleeve and coöperating with said index finger, stops limiting said sleeve against longitudinal movement on the pipe, a sleeve mounted upon the other end of said pipe, this end of the pipe having a slot in one side and the sleeve having a pin entering said slot to prevent rocking movement upon the pipe, a gage finger pivoted upon said sleeve to swing in the plane of the pipe, an index finger carried by said gage finger and a scale coöperating therewith carried by the sleeve, and means for clamping said sleeve in place upon the pipe.

In testimony whereof I have hereunto affixed my signature this 24th day of June, 1913.

MANFRED W. LINK.

Witnesses:
CARL E. CROSON,
CLAUDE E. STEVENS.